US008065137B2

(12) United States Patent
Metz et al.

(10) Patent No.: US 8,065,137 B2
(45) Date of Patent: Nov. 22, 2011

(54) APPARATUS AND METHOD FOR IDENTIFYING SIGNAL FRAMES AS AUDIO SIGNAL FRAMES

(75) Inventors: Norbert Metz, Hoehenkirchen-Siegertsbrunn (DE); Johann Steger, Munich (DE); Thomas Hauser, Munich (DE); Martin Krueger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 929 days.

(21) Appl. No.: 11/673,133

(22) Filed: Feb. 9, 2007

(65) Prior Publication Data

US 2007/0192096 A1 Aug. 16, 2007

(30) Foreign Application Priority Data

Feb. 9, 2006 (DE) ......................... 10 2006 006 066

(51) Int. Cl.
*G10L 15/20* (2006.01)
*G10L 19/00* (2006.01)
*G10L 21/00* (2006.01)
*H04J 3/06* (2006.01)

(52) U.S. Cl. ........ 704/201; 370/503; 704/214; 704/233; 704/500; 704/503

(58) Field of Classification Search .................. 704/214, 704/500; 370/503
See application file for complete search history.

(56) References Cited

U.S. PATENT DOCUMENTS

2004/0006462 A1 1/2004 Johnson
2007/0140499 A1 * 6/2007 Davis .............................. 381/23

OTHER PUBLICATIONS

3rd Generation Partnership Project; Technical Specification Group Services and System Aspects; Full rate speech; Transcoding (Release 6); Global Systems for Mobile Communications, 3GGP TS 46.010, V6.0.0 (Dec. 2004).

3rd Generation Partnership Project; Technical Specification Group Services and System Aspects; Full rate speech; Substitution and muting of lost frames for full rate speech channels (Release 4); Global Systems for Mobile Communications, 3GGP TS 46.011, V4.0.0 (Mar. 2001).

3rd Generation Partnership Project; Technical Specification Group Services and System Aspects; Full rate speech; Comfort noise aspect for full rate speech traffic channels (Release 6); Global Systems for Mobile Communications, 3GGP TS 46.012, V6.0.0 (Dec. 2004).

3rd Generation Partnership Project; Technical Specification Group Services and System Aspects; Full rate speech; Discontinuous Transmission (DTX) for full rate speech traffic channels (Release 6); Global Systems for Mobile Communications, 3GGP TS 46.031, V6.0.0 (Dec. 2004).

* cited by examiner

*Primary Examiner* — Justin Rider
(74) *Attorney, Agent, or Firm* — Dicke, Billig & Czaja, PLLC

(57) ABSTRACT

A system and apparatus for establishing whether a received signal frame is an audio signal frame is disclosed. In one embodiment, the system includes a predetermined position in an audio signal frame containing a piece of secondary information for an audio characteristic of the audio data, with a selection device for selecting a succession of bits which is arranged at the predetermined position in the received signal frame. A decision-making device flags the received signal frame as an audio signal frame if the succession of bits represents the piece of secondary information.

21 Claims, 2 Drawing Sheets

FIG 2A

| Name | Description | Orientation |
|---|---|---|
| ENCODER OUTPUT / DECODER INPUT | | |
| LARc[1] | 6 bits : 1st Log.-Area Ratio | Right |
| LARc[2] | 6 bits : 2nd Log.-Area Ratio | Right |
| LARc[3] | 5 bits : 3rd Log.-Area Ratio | Right |
| LARc{4] | 5 bits : 4th Log.-Area Ratio | Right |
| LARc[5] | 4 bits : 5th Log.-Area Ratio | Right |
| LARc[6] | 4 bits : 6th Log.-Area Ratio | Right |
| LARc[7] | 3 bits : 7th Log.-Area Ratio | Right |
| LARc[8] | 3 bits : 8th Log.-Area Ratio | Right |
| Subframe No. 1 | | |
| Nc | 7 bits: LTP delay | Right |
| bc | 2 bits: LTP gain | Right |
| Mc | 2 bits: RPE grid position | Right |
| xmaxc | 6 bits: block amplitude | Right |
| xMc[0...12] | 3 bits: RPE pulse index 0 to 12 | Right |
| Subframe No. 2 | | |
| Nc | 7 bits: LTP delay | Right |
| bc | 2 bits: LTP gain | Right |
| Mc | 2 bits: RPE grid position | Right |
| xmaxc | 6 bits block amplitude | Right |
| xMc[0...12] | 3 bits: RPE pulse index 0 to 12 | Right |
| Subframe No. 3 | | |
| Nc | 7 bits: LTP delay | Right |
| bc | 2 bits: LTP gain | Right |
| Mc | 2 bits: RPE grid position | Right |
| xmaxc | 6 bits: block amplitude | Right |
| xMc[0...12] | 3 bits: RPE pulse index 0 to 12 | Right |
| Subframe No. 4 | | |
| Nc | 7 bits: LTP delay | Right |
| bc | 2 bits: LTP gain | Right |
| Mc | 2 bits: RPE grid position | Right |
| xmaxc | 6 bits: block amplitude | Right |
| xMc[0...12] | 3 bits: RPE pulse index 0 to 12 | Right |

FIG 2B

| Name | Description | Orientation |
|---|---|---|
| DECODER OUTPUT | | |
| srop[1] | 13 bits: decoder output signal.<br>The 3 LSBs of the 16 bits are equal to 0 | Left |

APPARATUS AND METHOD FOR IDENTIFYING SIGNAL FRAMES AS AUDIO SIGNAL FRAMES

CROSS-REFERENCE TO RELATED APPLICATIONS

This Utility Patent Application claims priority to German Patent Application No. DE 10 2006 006 066.0 filed on Feb. 9, 2006, which is incorporated herein by reference.

BACKGROUND

The present invention relates to digital signal processing and particularly to the detection of audio data in a received signal frame.

In message transmission systems, for example in a GSM system as considered by way of example below, no radio signal is sent from the transmitter to the receiver in the case of a voice link during a break in speech. This method is referred to as discontinuous transmission (DTX) and is used both in the uplink direction (from the mobile station to the base station) and in the downlink direction (from the base station to the mobile station). The advantages of the DTX method are the reduced power consumption at the transmitter end and the reduced interference level in the entire radio network.

With activated DTX functionality, no signal is sent from the transmitter to the receiver during a break in speech, which means that only noise is received at the reception end. In this case, the receiver continually attempts to receive a valid GSM signal, for example. If the receiver receives a valid GSM signal, it forwards it to a voice decoder. If the receiver does not receive a valid GSM signal, however, it is assumed that the transmitted signal has been disconnected on account of a break in speech at the transmitter end. In that case, the receiver forwards a comfort noise block to the voice decoder in order to generate artificial background noise of the output of the voice decoder.

During a break in speech, the receiver should therefore receive only noise and replace it with comfort noise (CN) in the voice decoder. Problems arise here if the receiver mistakenly detects the received signal containing no voice data as a valid GSM signal containing voice data. In this case, the supposed GSM signal is not replaced by comfort noise but rather is forwarded to the voice decoder. The information content of the supposed GSM signal is arbitrary, however, which means that a cracking sound ("Bong") of greater or lesser volume is obtained at the output of the voice decoder. These cracking sounds are generally irritating because they occur during a break in speech, that is to say during a relative silent break in the voice signal.

ETSI specifications 3GPP 46.011, 3 GPP 46.012 and 3GPP 46.031 specify the following standard solution for DTX handling in the full-rate voice decoder:

In a first process, the type of the currently received voice frame is determined. A voice frame corresponds to a voice signal of 20 ms in length. To this end, the bits (flags) determined in the channel decoder—BFI (Bad Frame Indication), SID (Silent Descriptor Frame) and TAF (Time Alignment Flag)—are evaluated. Accordingly, the type of the current voice frame (subsequently also called "Frame Type") may assume one of the following values:

GOOD_SPEECH: Valid voice frame

UNUSABLE: Invalid voice frame

VALID_SID: Valid SID frame

Using an SID frame, a.) the comfort noise (background noise) is parameterized at periodic intervals and b.) a DTX period is initiated after a period of speech.

INVALID_SID: invalid SID frame

In addition, the current state of the DTX handling is considered. This state (subsequently called "DTX State") may assume one of the following two values:

SPEECH_STATE: The DTX handling is in this state if a period of speech is currently in progress. That is to say that no comfort noise has been generated by the voice decoder in the past voice frames.

CNI_STATE: The DTX handling is in this state if a break in speech is currently in progress, i.e. if comfort noise has been generated by the voice decoder in the past voice frames.

On the basis of the frame type and the DTX state, the following data are forwarded to the actual voice decoder:

if the frame type has the value GOOD_SPEECH, this frame is forwarded directly to the voice decoder and the DTX state is set to the value SPEECH_STATE. It is assumed that a period of speech is in progress or that one is just starting.

if the frame type has the value VALID_SID or INVALID_SID, this frame is forwarded to the voice decoder for the purpose of comfort noise generation and the DTX state is set to the value CNI_STATE. It is assumed that a break in speech is in progress or that one is just starting.

if the frame type has the value UNUSABLE, the operation of the voice decoder is dependent on the DTX state.

such a frame type in the DTX state SPEECH_STATE (that is to say during a period of speech) indicates to the voice decoder that this voice frame has been lost and therefore the "Muting Mechanism" needs to be activated.

such a frame type in the DTX state CNI_STATE (that is to say during a break in speech) indicates to the voice decoder that the transmitter has been switched off and therefore a comfort noise frame needs to be inserted.

A very irritating effect is obtained if a voice frame is mistakenly detected as GOOD_SPEECH in a break in speech (DTX state has the value CNI_STATE). In that case, this supposedly good voice frame is forwarded directly to the voice decoder and produces a cracking sound of greater or lesser volume (depending on its random content) at the output thereof. In addition, the supposedly good voice frame causes the DTX state to change to SPEECH_STATE (supposed start of a new period of speech). Since, in reality, the break in speech has not yet ended, however, the transmitter continues to be switched off, which is why the receiver will detect the frame type UNUSABLE again for the further voice frames. However, these voice frames with the frame type UNUSABLE result in the aforementioned "Muting Mechanism" in the DTX state SPEECH_STATE, i.e. the previously received supposedly valid voice frame is now also repeated and attenuated, which means that the aforementioned cracking sound (as a result of the repetition) is now also given a metallic character ("Bong").

To compensate for this weakness in the standard solution of the DTX handling, great effort has been made in the past in attempting to improve the basis for frame type determination (BFI, SID and TAF) outside the voice decoder. This has been done by evaluating additional parameters, such as equalizer or channel decoder results. However, this solution has the drawback that it needs to be simulated, implemented and verified afresh for each baseband chip. The actual problem, however, is the lack of robust error concealment in the full-rate voice decoder, which is not covered by the GSM standard.

For these and other reasons, there is a need for the present invention.

SUMMARY

One embodiment provides a signal processing system including a selection device configured for selecting a succession of bits which is arranged at the predetermined position in a received signal frame. A decision-making device is configured to flag the received signal frame as an audio signal frame if the succession of bits represents the piece of secondary information.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIGS. 2*a*, 2*b* illustrate the design of a GSM signal.

DETAILED DESCRIPTION

Figure 1:
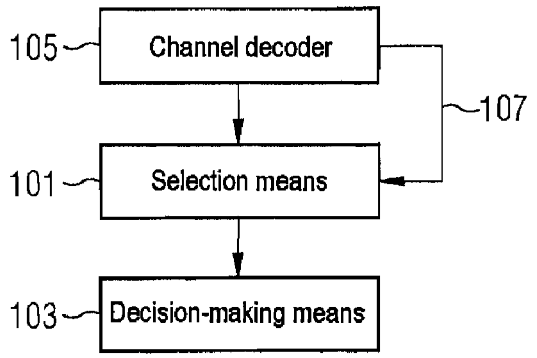
FIG. 1 illustrates a block diagram of an inventive apparatus based on an exemplary embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One or more embodiments of the present invention provide an efficient and reliable concept for establishing whether a received signal frame is an audio signal frame.

One embodiment of the invention is based on the insight that audio signal frames often include a piece of secondary information for an audio characteristic of the audio data. The piece of secondary information, which is represented by a succession of bits, is at a predetermined position in an audio signal frame. If the predetermined position in the received signal frame includes such a piece of secondary information then the received signal frame is an audio signal frame. On the other hand, if the predetermined position in the received signal frame does not include such a piece of secondary information then the received signal frame is not a valid audio signal frame. For the purpose of detecting the piece of secondary information in the received signal frame, the invention allows the use of properties which are to be expected (e.g., in the case of a language) for the piece of secondary information, such as its size or its value which can be represented as a number.

By way of example, a piece of secondary information may be a power scaling factor or an amplitude scaling factor which can be applied to the decoded audio signals, for example in order to obtain the desired volume. In the case of GSM audio signal frames (voice data signal frames), the secondary information transmitted is what are known as the XMAXC coefficients, which are amplitude scaling coefficients.

In one embodiment, the present invention provides an apparatus for establishing whether a received signal frame is an audio signal frame which includes audio data, a predetermined position in an audio signal frame having a piece of secondary information for an audio characteristic of the audio data.

The apparatus includes a selection device for selecting a succession of bits which are arranged at the predetermined position in the signal frame at which the piece of secondary information is to be expected.

In addition, the apparatus includes a decision-making device which receives the selected succession of bits from the selection device and which is designed to take the selected succession of bits as a basis for deciding whether the received audio signal frame is a (valid) audio signal frame. The decision-making device flags the received signal frame as an audio signal frame if the succession of bits represents the piece of secondary information. By way of example, the audio signal frame can be flagged by appending a flag field to the received signal frame, by setting one or more bits in a field of the received signal frame or by generating a separate information signal.

The decision-making device can take the selected bit succession, for example, as a basis for first of all determining whether it represents the amplitude scaling coefficient or the power coefficient.

In one embodiment, the decision-making devices designed to determine a number, for example a binary number, represented by the succession of bits and to compare this number with a prescribed threshold value. If the number represented by the succession of bits is below the prescribed threshold value, the decision-making device flags the received signal frame as an audio signal frame.

In one embodiment, the prescribed threshold value is always smaller than the maximum number which can be represented by the succession of bits. The maximum number which can be represented by 6 bits, for example is 63.

If the piece of secondary information is an amplitude scaling coefficient, for example, the invention makes use of the fact that the amplitude scaling coefficient cannot change abruptly if the audio data are voice data. In the case of the GSM transmission, the amplitude scaling coefficient XMAXC, which is represented by 6 bits, can have values from 0 to 63, for example.

As part of a further insight, it has been established that this amplitude scaling coefficient is, on average and particularly at the start of a voice data transmission, smaller than the largest number which can be represented by the 6 bits. The threshold value may be a mean value, established empirically, for example, over a plurality of amplitude scaling coefficients. In the case of a GSM transmission, the threshold value may assume values between 5 and 30 or between 8 and 20 or 8 and 16.

If the result of the comparison made by the decision-making devices that the number represented by the selected succession of bits is above the predetermined threshold value then the decision-making devices designed to flag the received signal frame as a non-audio signal frame or to reject the received signal frame.

Figure 3:
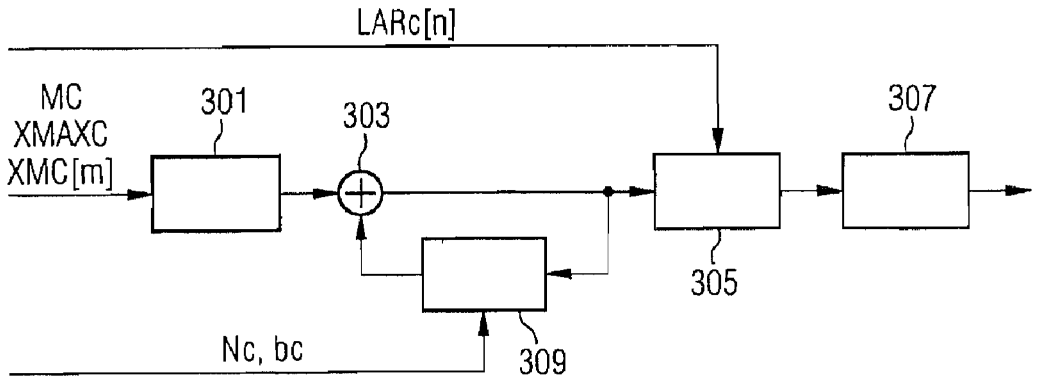
FIG. 3 illustrates a GSM voice decoder.

The inventive apparatus may be connected upstream of a voice decoder, for example. FIG. 3 illustrates a voice decoder based on the standard ETS 300 961 (GSM 06.10 version 5.1.1, May 1998). The decoder includes an RPE unit 301 (RPE grid decoding and positioning), an adder 303, a short-term synthesis filter 305, a further processing unit 307 (post processing) and a long-term synthesis filter 309. The simplified block diagram of an RPE-LTP decoder illustrated in FIG. 3 processes input data of the kind specified in specification IT 300 961 (GSM 06.10 version 5.1.1, May 98) and illustrated in FIGS. 2*a* and 2*b*.

By way of example, the RPE unit 301 illustrated in FIG. 3 receives the RPE parameters at a rate of 47 bits/5 ms. These may be the parameters Mc, XMAXC or xMc[m], for example. The short-term synthesis filter 305 receives reflection coefficients which have been encoded as logarithm area ratios (LOG area ratio) and which are transmitted at a rate of 36 bits/20 ms. The reflection coefficients may be the LARc[n] coefficients illustrated in FIG. 2*a*, for example. The long-term synthesis filter 309 receives the LTP parameters Nc, bc at a rate of 9 bits/5 ms, for example.

The aforementioned ETSI specification defines the necessary performance characteristics of the audio components which are required for the voice transcoder to operate correctly. The performance characteristics indicated in the aforementioned standard relate to a 13-bit uniform PCM interface.

In another embodiment, the inventive apparatus may be connected downstream of a channel decoder which is designed to convert the received signal into the received signal frame by device channel decoding (for example using Viterbi decoding). In addition, the channel decoder may be designed to take one or more synchronization bits (e.g., TAF), indicating the presence of audio data, as a basis for carrying out audio frame recognition.

If the decoder recognizes audio signal data in the received signal frame, it outputs the aforementioned signal GOOD_SPEECH, which indicates a valid voice frame. This signal is a control signal which prompts activation of the inventive apparatus and a subsequent check on the decision made by the channel decoder. The GOOD_SPEECH signal is forwarded to the selection device, which selects the succession of bits as a response.

If the decoder has not recognized a valid audio data frame, on the other hand, then it outputs the signal UNUSABLE, which indicates an invalid audio data frame. If the control signal which indicates that the received signal frame is not an audio signal frame is present then the inventive apparatus is not activated, which device that the decision by the channel decoder is not checked in this case.

The inventive apparatus connected downstream of the decoder checks whether the received signal frame which has been recognized as a valid voice frame by the upstream channel decoder is actually a voice frame or whether it is just a voice frame which has been mistakenly recognized as valid during the DTX phase. This additional check is made before the data are forwarded to the voice decoder.

In the case of a control signal which indicates a valid audio signal frame, the inventive apparatus is activated only if the received signal frame is a first received signal frame in a succession of received signal frames which (first received signal frame) has been recognized and flagged as an audio signal frame by the upstream channel decoder. The inventive apparatus is designed to evaluate the first signal frame received after a break in speech which has been flagged as a valid voice frame by the upstream channel decoder in order to verify the decision by the channel decoder. If the inventive apparatus takes the threshold value comparison as a basis for establishing whether the received signal frame already flagged as an audio signal frame is actually a signal frame then the invention makes use of the fact that in the case of a GSM system, for example, the amplitude factor XMAXC is low for the first voice frame or for a succession of first voice frames flagged as valid. The reason for this is that the volume of a voice signal cannot increase explosively.

In another embodiment, the inventive apparatus includes a channel decoder which is designed to convert a received signal into the received signal frame by device channel decoding and to detect the audio data. In order to detect the audio data, the decoder can be designed to compare the number of bit errors which is detected during the decoding with a prescribed threshold value (e.g., 10, 20 or 50 bit errors). If the number of bit errors is above the threshold value, the signal frame is not flagged as an audio signal frame. If the number of bit errors is below the threshold value, it is concluded that the audio data are present and the signal frame is flagged as an audio signal frame. The channel decoder may also be designed to detect the audio data on the basis of the CRC check. If the result of the CRC check is that no or only few bit errors are present then the signal frame is flagged as an audio signal frame. If the result of the CRC check is negative, the signal frame is not flagged as an audio signal frame, on the other hand.

If an audio signal frame is made up of a plurality of subframes, as is the case with a GSM voice frame, for example, then a number of predetermined positions in a valid audio signal frame respectively include a piece of secondary information for the audio data.

FIG. 2*a* illustrates a design for a GSM voice frame containing four subframes 1-4. Each subframe contains the amplitude scaling coefficient XMAXC, which is always arranged at a predetermined point in the voice data frame and in the respective subframe. As FIG. 2*a* also reveals, the amplitude scaling coefficients XMAXC are respectively represented by a succession of 6 bits.

In one embodiment, the inventive selection device is designed to select the successions of bits which are respectively arranged at the predetermined positions in order to obtain the number of successions of bits, for example four successions of bits, and to take the number of successions of bits as a basis for establishing whether the received signal frame is an audio signal frame which contains audio data.

To establish whether the received signal frame is an audio signal frame, the decision-making device may be designed to compare the largest number represented by one of the successions of bits (i.e. the largest of the numbers represented by the successions of bits) with a prescribed threshold value and to flag the received signal frame as an audio signal frame if the largest number is below the threshold value. By way of example, the prescribed threshold value may assume values between 5 and 20 or 5 to 18 or 8 to 16.

In another embodiment, the selection device may be designed to compare the smallest number represented by one of the successions of bits with the prescribed threshold value and not to treat the received signal frame as an audio signal frame if the smallest number is above the prescribed threshold value.

One advantage of the inventive concept is that it is possible to prevent decoding of an audio signal frame which has been mistakenly recognized as valid, for example a GSM signal which has been mistakenly recognized, and hence the generation of a "Bong". The inventive solution can also be implemented easily and inexpensively in existing systems.

The apparatus for establishing whether a received signal frame is a valid audio signal frame, illustrated in FIG. 1, includes a selection device 101 with an output which is coupled to an input of a decision-making device 103. The selection device 101 is designed to receive, via a first input, the received signal frames coming from a channel decoder 105, and control signals which activate the selection device 101. Optionally, the selection device 101 may have a further input 107 to which the control signals can be applied.

In one embodiment, the apparatus includes the selection device 101 and the decision-making device 103 may be connected downstream of the channel decoder 105. In this case, the channel decoder 105 is not part of the inventive apparatus. In another embodiment, the channel decoder 105 may be part of the inventive apparatus.

The channel decoder 105 receives received signals via an input (not illustrated in FIG. 2) and decodes these signals using a channel decoding scheme. The channel decoding scheme may be Viterbi detection, for example. In addition, the channel decoder 105 performs audio data detection in order to make a first decision regarding whether the signal frame which is output by the channel decoder 105 is an audio signal frame. If this is established to be true, the channel decoder 105 outputs a control signal which flags the received signal frame as an audio signal frame. The channel decoder 105 detects the audio data as described above. In another embodiment, the channel decoder 105 may be designed to establish the presence of the audio data in the received signal during the decoding, for example on the basis of a metric which needs to be generated for the purpose of decoding.

In one embodiment, the channel decoder 105 may be designed to output the received voice frame together with the control signal. In another embodiment, the channel decoder 105 may be designed to output the control signal separately.

In another embodiment, the output of the channel decoder 105 can be connected directly to an audio decoder (not illustrated in FIG. 1). In this case, the selection device 101 and the decision-making device 103 are arranged in parallel with the output path in order to verify the decisions by the channel decoder 105. If the channel decoder 105 has mistakenly flagged a received signal frame as a valid audio signal frame, for example, then the decision-making device 103 can use a further piece of control information to inform an audio decoder (for example the voice decoder illustrated in FIG. 3) that the received signal frame which has been mistakenly flagged as a valid audio signal data frame is not an audio signal frame, so that decoding of the received signal frame is prevented.

One embodiment of the invention, the apparatus illustrated in FIG. 1 is used to check the decision by the channel decoder 105 directly after a break in speech. As described above, the use of the solution which is known from the prior art results in a problem if a voice frame is mistakenly detected as valid in the receiver during a break in speech. The break in speech is characterized in that the transmitter is switched off and in that the receiver should recognize only invalid voice frames and should accordingly generate the comfort noise. The incorrect recognition results in the aforementioned irritating cracking sound during the relative silent break of the break in speech.

To get around this problem, one aspect of the invention pays particular attention to the first voice frame recognized as valid after a break in speech. In this case, the voice frames which are (for the time being) recognized as valid are not forwarded to the voice decoder unconditionally but rather are also subjected to an additional test beforehand.

This additional test can now confirm either that these are valid voice frames or that they are not. If the signal is a GSM signal then in the case of confirmation the procedure can be based on the standard solution, for example.

The voice frame is forwarded to the voice decoder and the DTX state changes from CNI_STATE to SPEECH_STATE. The break in speech is declared to have ended and the voice data start to be decoded again.

If the original frame type decision is corrected, however, the frame type is reset to UNUSABLE. The DTX state does not change from CNI-STATE to SPEECH_STATE and the generation of comfort noise is continued.

The additional test for the later frame type check has the following appearance:

1. It is used if a valid voice frame (frame type has the value GOOD_SPEECH) has been detected in a break in speech (DTX state has the value CNI_STATE).

2. If one of the four amplitude scaling factors XMAXC for the four subframes of the voice frame under consideration (see ETSI specification for the full-rate voice encoder 3GPP 46.010) is above a previously stipulated threshold value, the original frame type decision is revoked and the voice frame under consideration is classified as UNUSABLE.

3. No later than after the n-th successive voice frame detected as valid, the original decision can no longer be revoked. Then, there is a switch from CNI_STATE to SPEECH_STATE in each case and the break in speech is declared to have ended. The value "n" can be set on a selectable basis (typical values for n: 2 or 3).

This additional test for the later frame type check causes a significant reduction in the irritating "Bongs". The resultant voice quality is significantly improved thereby.

In one embodiment of the invention, the first received voice frames in a period of speech starting with a very high level of energy (large values of XMAXC) are therefore rejected. It is therefore also possible to prevent overload in the reception or reproduction path.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A digital communication device comprising:

a channel decoder configured to recognize a received signal frame as an audio data frame by determining one or more synchronization bits from the received signal frame indicating a presence of audio data;

a selection device configured for selecting a succession of bits arranged at a predetermined position in the received signal frame; and a decision-making device configured to flag the received signal frame as an audio data if the succession of bits represents a piece of secondary information describing an audio characteristic of the audio data, wherein the selection device and the decision-making device are only activated to verify the recognition of the channel decoder if the channel decoder has recognized an audio data frame in the received signal frame.

2. The device of claim 1, wherein the decision-making device is designed to flag the received signal frame as a non-audio signal frame if a value represented by the succession of bits is above a prescribed threshold value.

3. The device of claim 2, wherein the prescribed threshold value is smaller than a maximum value which can be represented by the succession of bits.

4. The device of claim 1, wherein the channel decoder is configured to output a first control signal if the channel decoder has recognized an audio data frame in the received signal frame, and the first control signal activates the selection device and decision-making device to verify the recognition of the channel decoder.

5. The device of claim 1, wherein the channel decoder is configured to output a second control signal if the channel decoder has not recognized an audio data frame in the received signal frame, and the second control signal does not activate the selection device and the decision-making device to verify the recognition of the channel decoder.

6. The device of claim 1, further comprising a voice decoder, wherein the received signal frame is forwarded to the voice decoder after verification of the recognition channel decoder by the selection device and the decision-making device.

7. An digital communication device for establishing whether a received signal frame is an audio data frame which comprises audio data, a predetermined position in an audio data frame containing a piece of secondary information for an audio characteristic of the audio data, comprising:

a channel decoder configured to recognize the received signal frame as an audio data frame by determining one or more synchronization bits from the received signal frame indicating a presence of audio data;

a selection device configured for selecting a succession of bits which is arranged at the predetermined position in the received signal frame; and a decision-making device configured device to flag the received signal frame as an audio signal frame if the succession of bits represents a piece of secondary information describing an audio characteristic of the audio data, wherein the selection device and the decision-making device are only activated to verify the recognition of the channel decoder if the channel decoder has recognized an audio data frame in the received signal frame.

8. The device of claim 7, wherein the decision-making device is designed to flag the received signal frame as a non-audio signal frame if a number represented by the succession of bits is above a prescribed threshold value.

9. The device of claim 8, wherein the prescribed threshold value is smaller than a maximum number which can be represented by the succession of bits.

10. The device of claim 7, wherein the channel decoder is configured to output a first control signal if the channel decoder has recognized an audio data frame in the received signal frame, and the first control signal activates the selection device and decision-making device to verify the recognition of the channel decoder.

11. The device of claim 7, wherein the channel decoder is configured to output a second control signal if the channel decoder has not recognized an audio data frame in the received signal frame, and the second control signal does not activate the selection device and the decision-making device to verify the recognition of the channel decoder.

12. The device of claim 8, wherein a number of predetermined positions in an audio signal frame respectively contain a piece of secondary information for the audio data, where the selection device is configured to select successions of bits which are arranged at the predetermined positions in order to obtain the number of successions of bits, and where the decision-making device is configured to flag the largest number represented by one of the successions of bits and to flag the received signal frame as an audio signal frame if the largest number is below the prescribed threshold value.

13. The device of claim 7, wherein the received signal frame is a GSM signal frame, where the audio data are voice data, and where the piece of secondary information is the XMAXC amplitude scaling factor.

14. A method for establishing whether a received signal frame is an audio data frame which contains audio data, a predetermined position in an audio data frame containing a piece of secondary information for an audio characteristic of the audio data, the method comprising:

recognizing the received signal frame as an audio data frame by determining one or more synchronization bits from the received signal frame indicating the presence of audio data;

selecting a succession of bits which is arranged at the predetermined position in the received signal frame; and flagging the received signal frame as an audio data if the succession of bits represents a piece of secondary information describing an audio characteristic of the audio data, wherein the selecting and the flagging are only performed to verify the recognition of an audio data frame being recognized in the received signal frame.

15. The method according to claim 14, comprising flagging the received signal frame as a non-audio signal frame if a number represented by the succession of bits is above a prescribed threshold value.

16. The method according to claim 15, wherein the prescribed threshold value is smaller than a maximum number which can be represented by the succession of bits.

17. The method according to claim 14, including outputting a first control signal if the received signal frame is recognized as an audio data frame, wherein the first control signal initiates the performance of the selecting and flagging to verify the recognition of the audio data frame in the received signal frame.

18. The method according to claim 14, including outputting a second control signal if an audio data frame is not recognized in the received signal frame, wherein the second control signal does not initiate the performance of the selecting and flagging to verify the recognition of the audio data frame in the received signal frame.

19. The method according to claim 14, wherein a number of predetermined positions in an audio data frame respectively contain a piece of secondary information for the audio data, in which successions of bits which are arranged at the predetermined positions are selected in order to obtain the number of successions of bits, and in which the largest number represented by one of the successions of bits is compared with a prescribed threshold value, and in which the received signal frame is flagged as an audio signal frame if the largest number is below the prescribed threshold value.

20. The method according to claim 14, wherein the received signal frame is a GSM signal frame, in which the audio data are voice data, and in which the piece of secondary information is the XMAXC amplitude scaling factor.

21. A signal processing system comprising:

means for recognizing a received signal frame as an audio data frame by determining one or more synchronization bits from the received signal frame indicating a presence of audio data;

means for selecting a succession of bits arranged at a predetermined position in the received signal frame; and means for flagging the received signal frame as an audio data frame if the succession of bits represents a piece of secondary information describing an audio characteristic of the audio data, wherein the means for selecting and the means for flagging are only activated to verify the recognition of the means for recognizing if the means for recognizing has recognized an audio data frame in the received signal frame.

* * * * *